July 5, 1949.  F. A. BLACK  2,475,003
BODY MANIPULATION APPARATUS
Filed Jan. 2, 1945  13 Sheets-Sheet 1
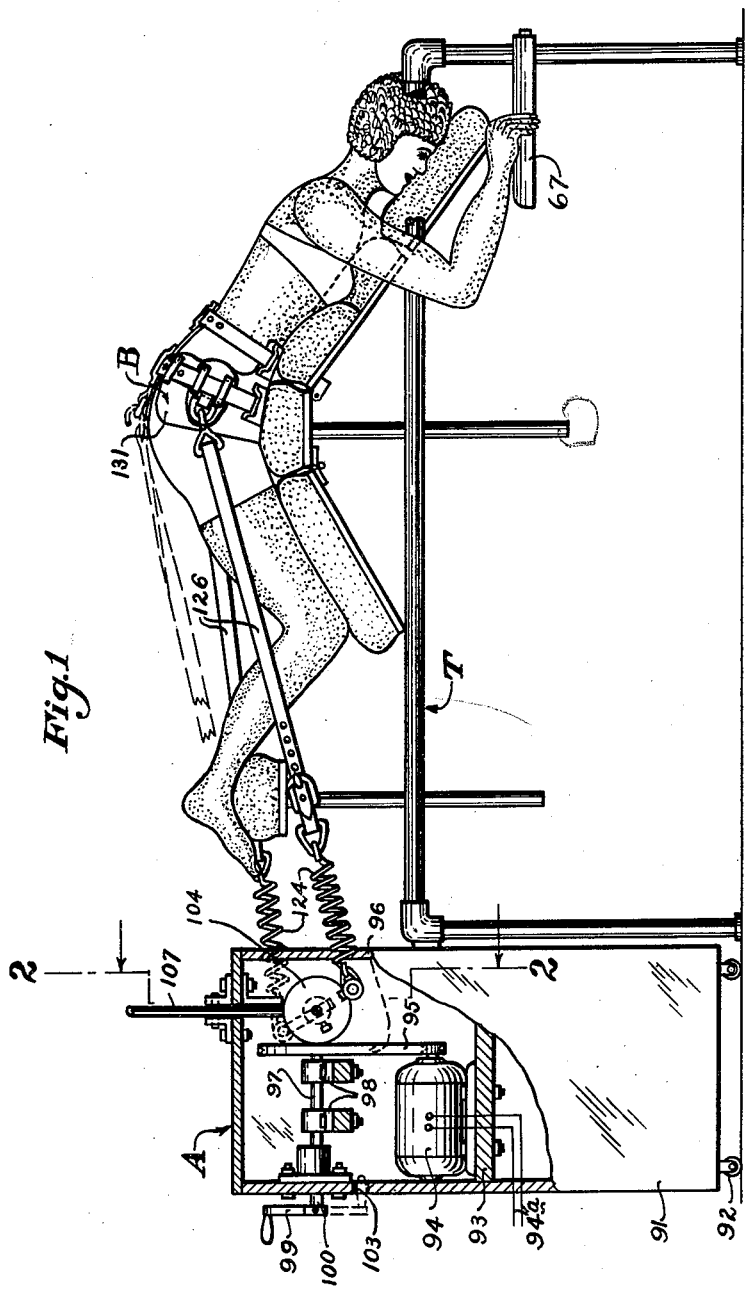
Fred A. Black
INVENTOR.
BY Wayland D. Keith
HIS AGENT.

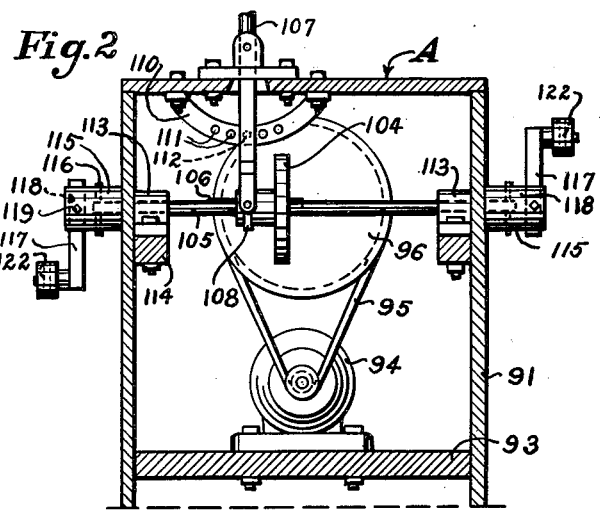
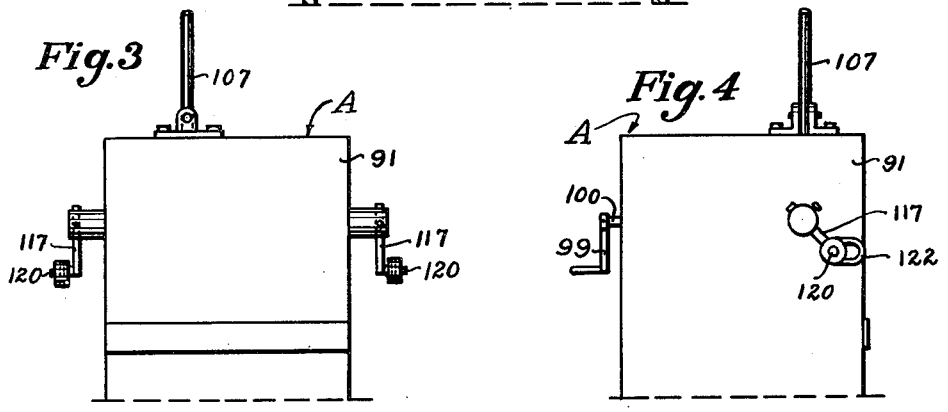
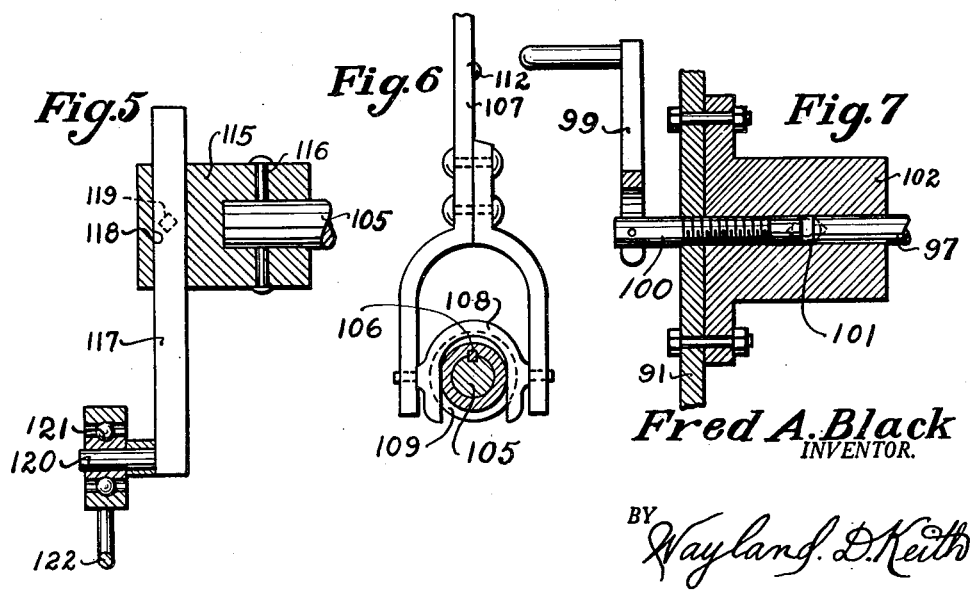

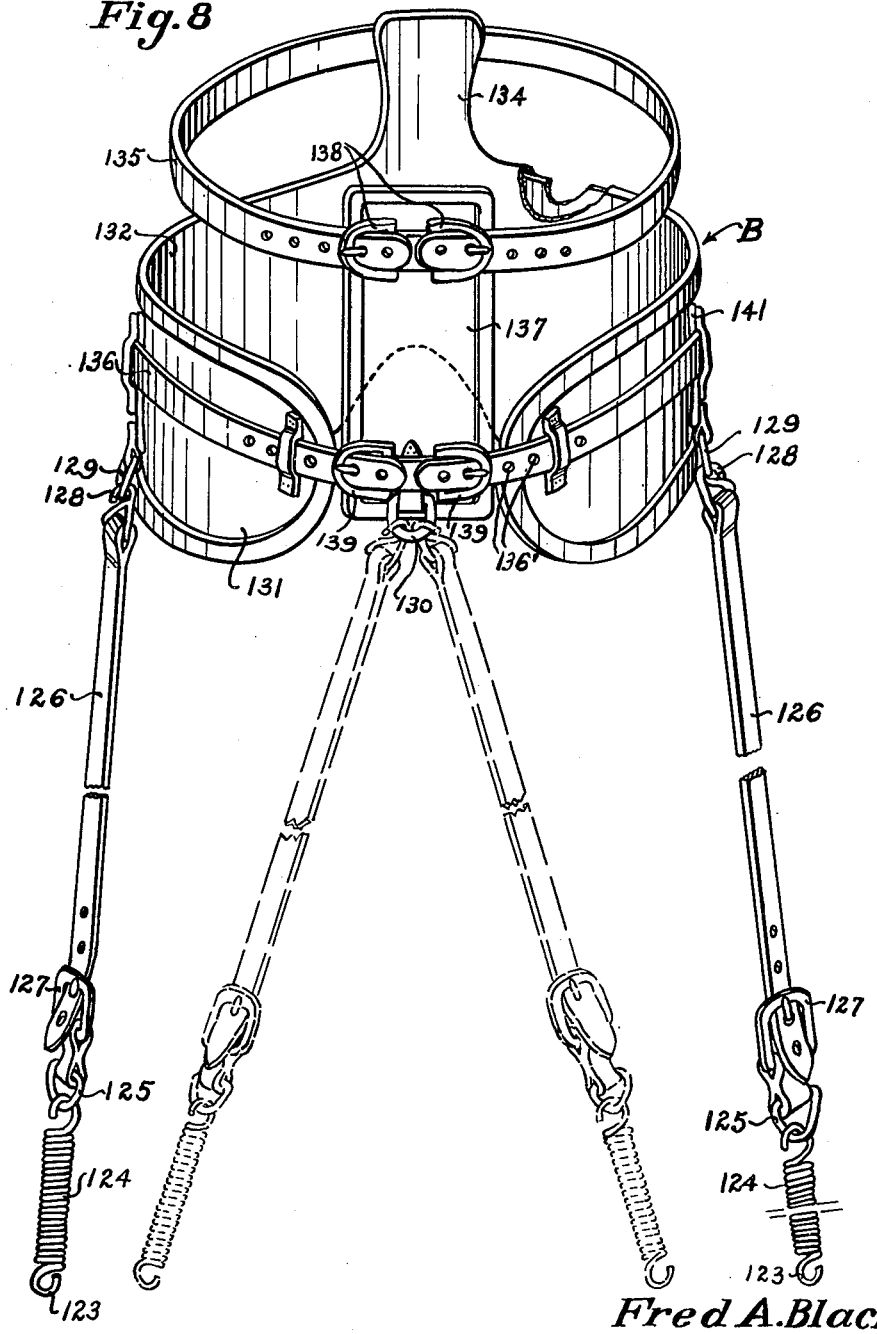

July 5, 1949.　　　　　F. A. BLACK　　　　　2,475,003
BODY MANIPULATION APPARATUS
Filed Jan. 2, 1945　　　　　　　　　　　　13 Sheets-Sheet 4
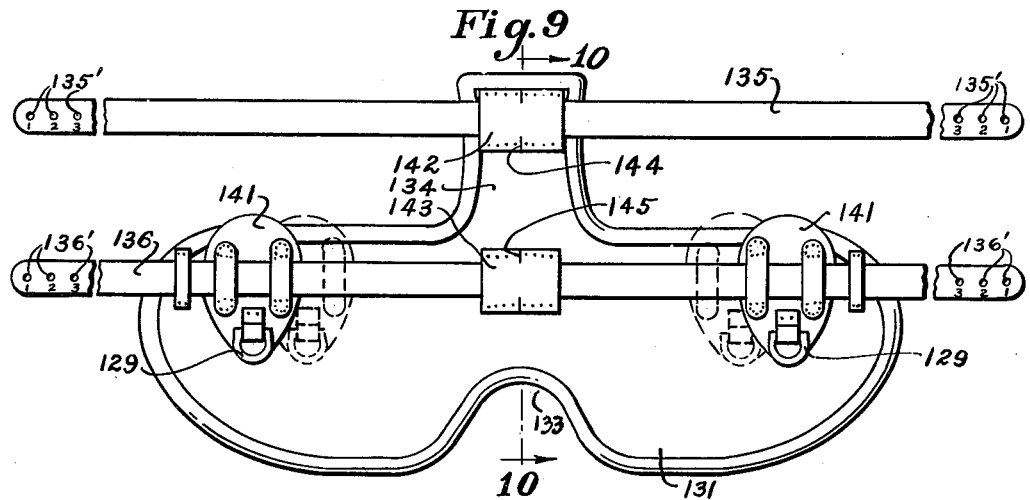
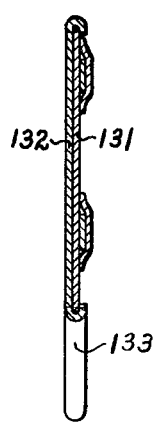 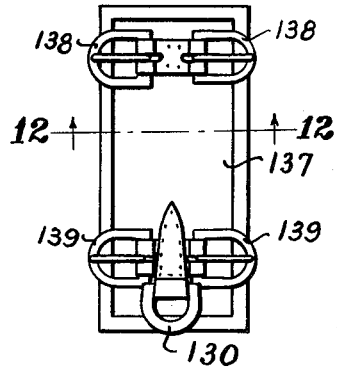 
Fred A. Black
INVENTOR.
BY Wayland D. Keith
HIS AGENT.

July 5, 1949.  F. A. BLACK  2,475,003
BODY MANIPULATION APPARATUS
Filed Jan. 2, 1945  13 Sheets-Sheet 5

Fred A. Black
INVENTOR.
BY Wayland D. Keith
HIS AGENT.

July 5, 1949.  F. A. BLACK  2,475,003
BODY MANIPULATION APPARATUS
Filed Jan. 2, 1945  13 Sheets-Sheet 7

Fig.15

Fred A. Black
INVENTOR.

BY
Wayland D. Keith
HIS AGENT.

July 5, 1949.  F. A. BLACK  2,475,003
BODY MANIPULATION APPARATUS
Filed Jan. 2, 1945  13 Sheets-Sheet 8
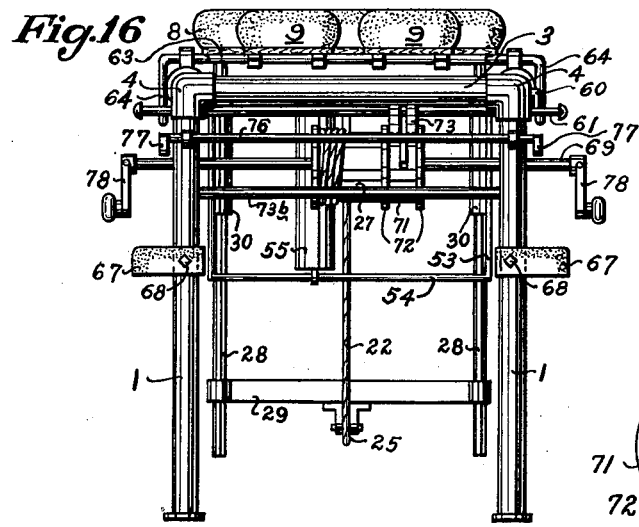
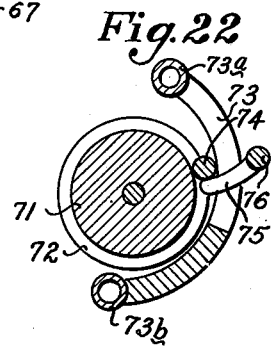
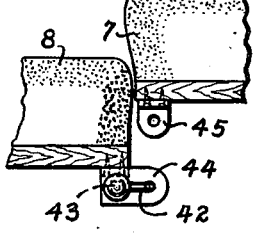
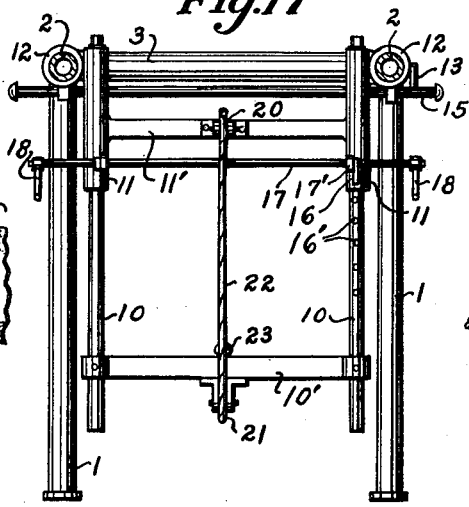
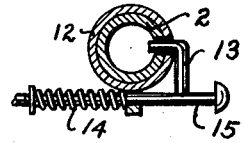
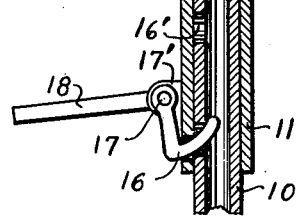
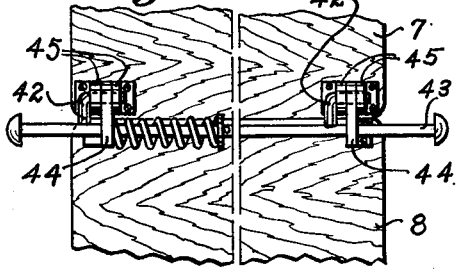
Fred A. Black
INVENTOR.
BY Wayland D. Keith
HIS AGENT.

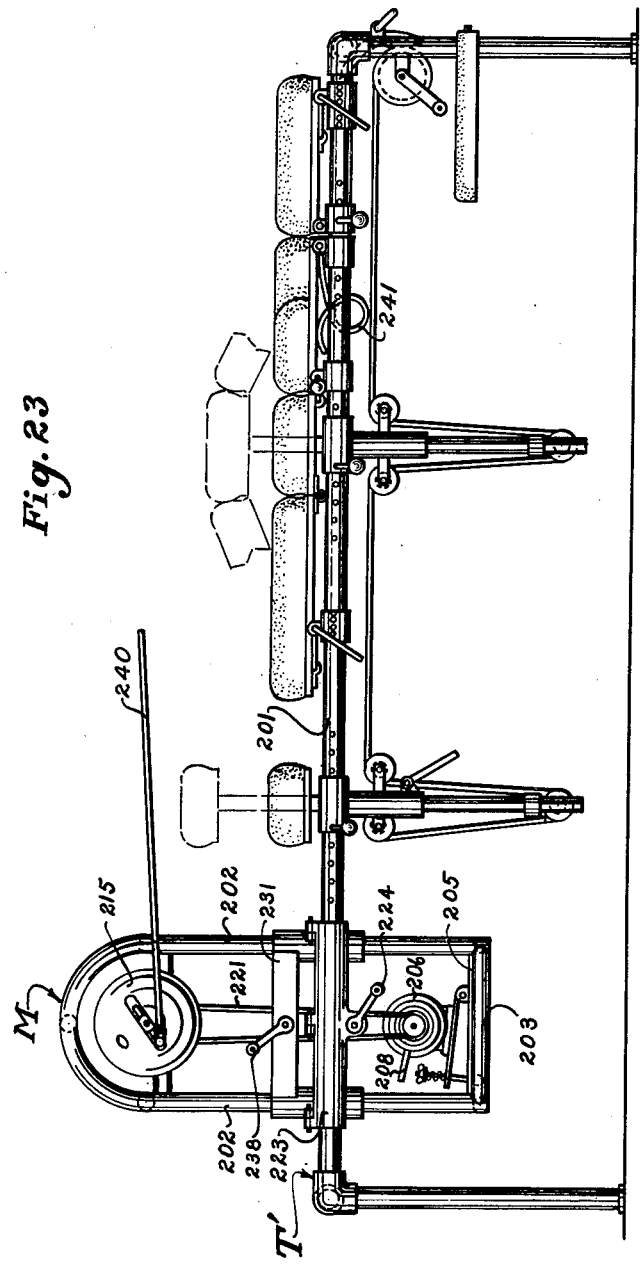

July 5, 1949.  F. A. BLACK  2,475,003
BODY MANIPULATION APPARATUS
Filed Jan. 2, 1945  13 Sheets-Sheet 10
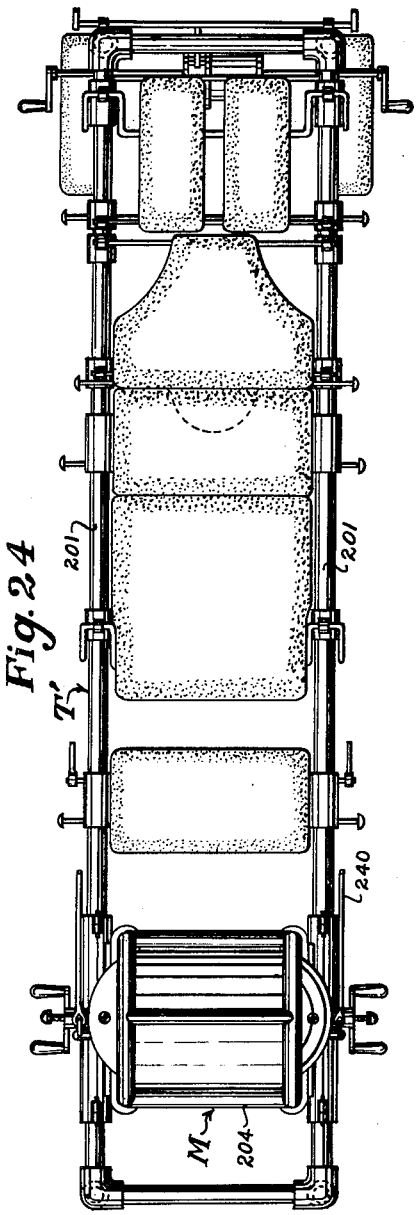
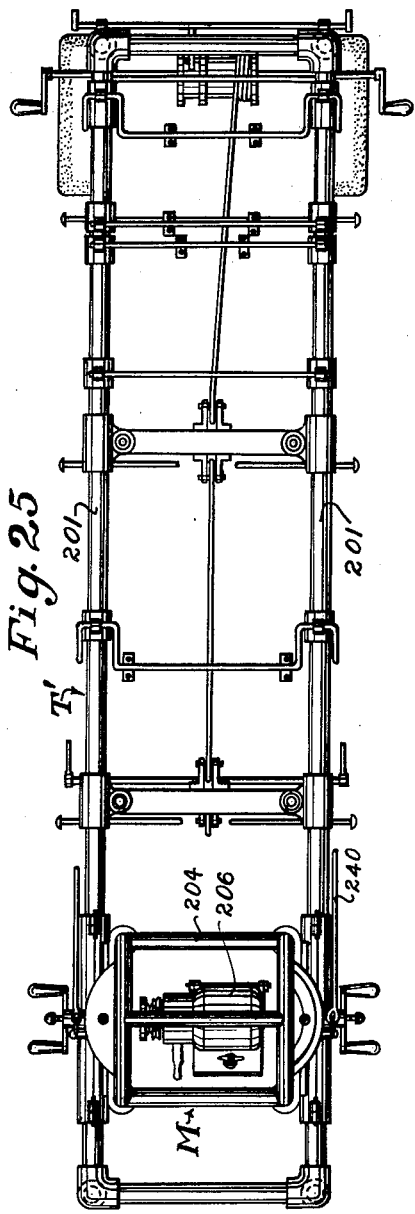
Fred A. Black
INVENTOR.
BY Wayland D. Keith
HIS AGENT.

July 5, 1949.  F. A. BLACK  2,475,003
BODY MANIPULATION APPARATUS
Filed Jan. 2, 1945  13 Sheets-Sheet 11
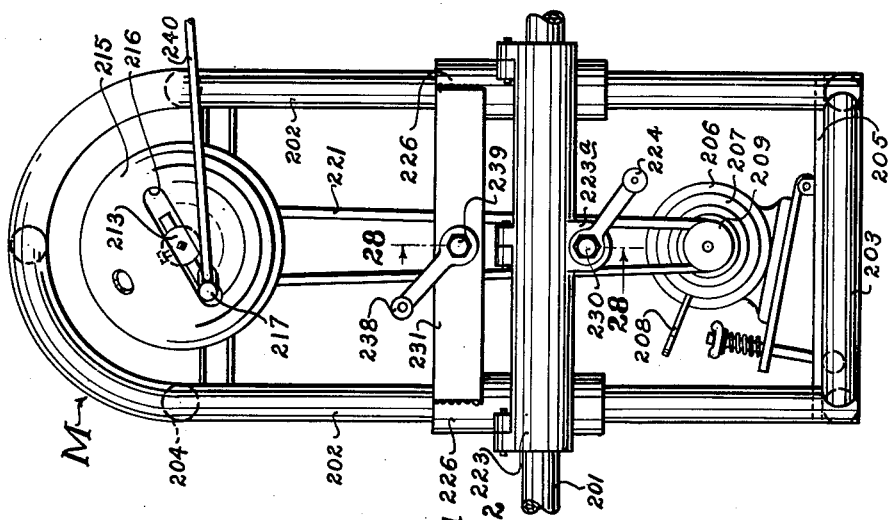
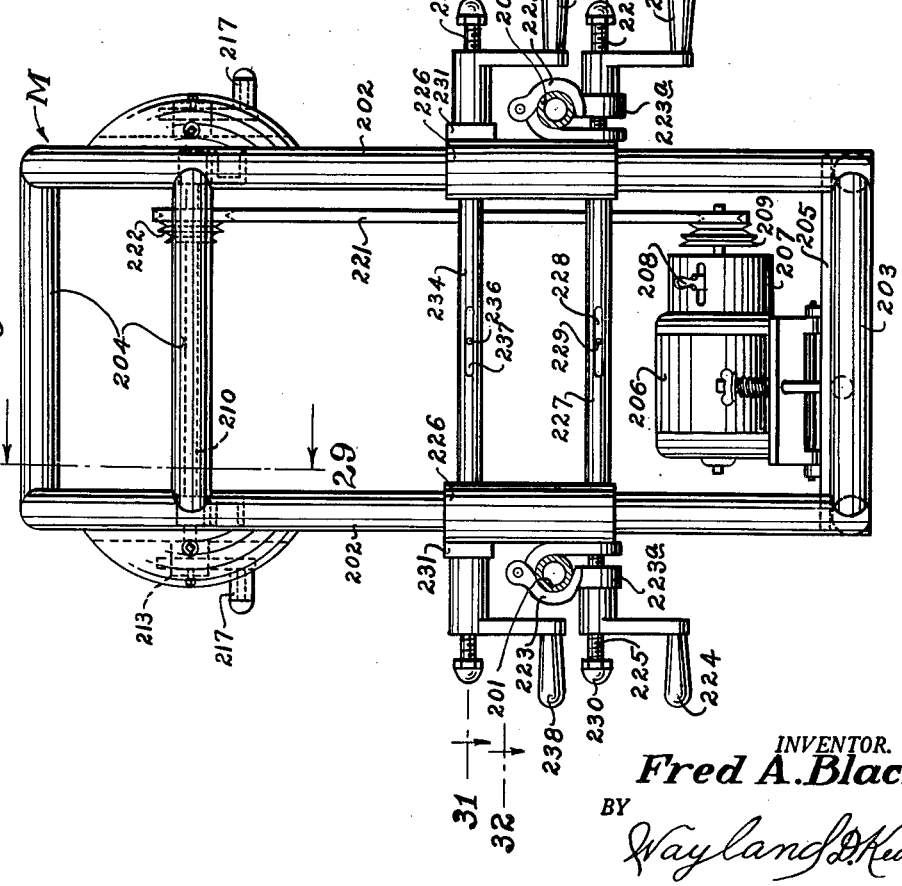
INVENTOR.
Fred A. Black
BY Wayland D. Keith
HIS AGENT.

July 5, 1949. F. A. BLACK 2,475,003
BODY MANIPULATION APPARATUS
Filed Jan. 2, 1945 13 Sheets-Sheet 12

Fred A. Black
INVENTOR.

BY
Wayland D. Keith
HIS AGENT.

July 5, 1949.                F. A. BLACK                2,475,003
                       BODY MANIPULATION APPARATUS
Filed Jan. 2, 1945                                 13 Sheets-Sheet 13
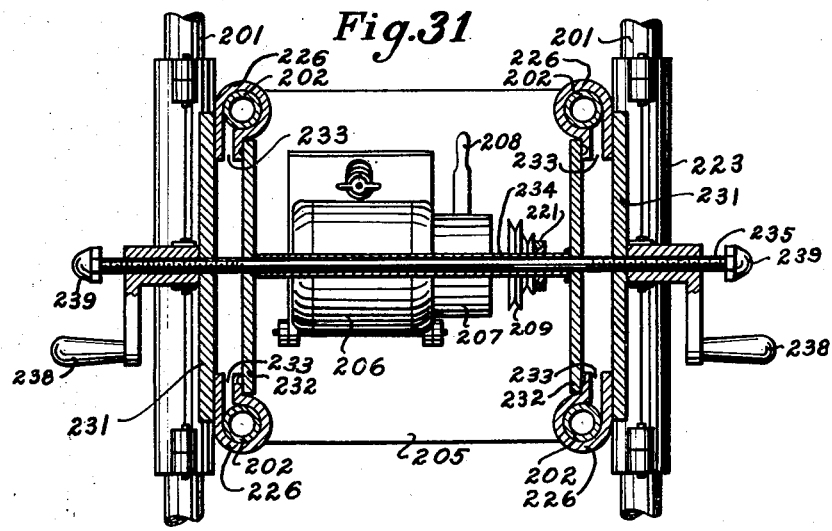
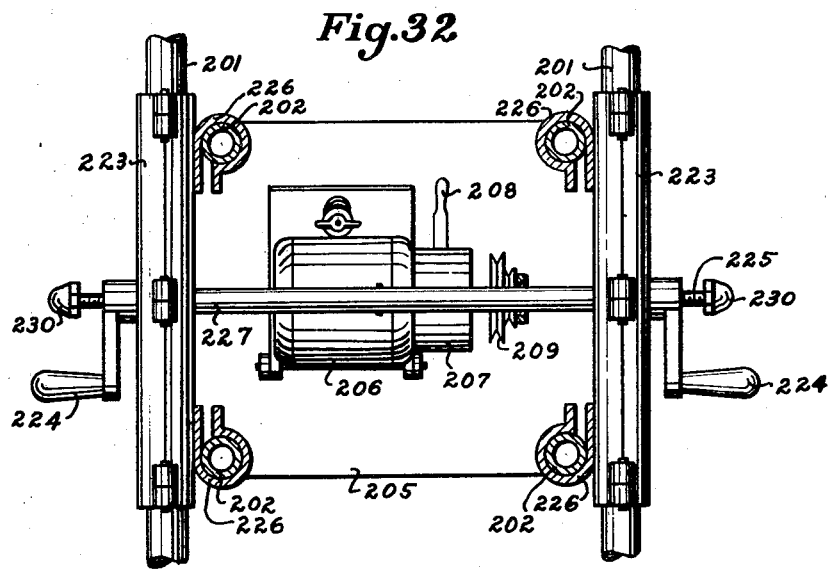
Fred A. Black
INVENTOR.
BY Wayland D. Keith
HIS AGENT.

Patented July 5, 1949

2,475,003

UNITED STATES PATENT OFFICE 2,475,003

BODY MANIPULATION APPARATUS

Fred A. Black, Wichita Falls, Tex., assignor of one-half to Lewis M. Black, Rockport, Tex.

Application January 2, 1945, Serial No. 571,099

9 Claims. (Cl. 128—71)

This invention relates to improvements in methods of and apparatus for increasing the flexibility of all weight bearing joints of the human body and for mechanically assisting the return to normal of the center of gravity of the human pelvis and spine.

The center of gravity of the normal human body is located just anterior the second tubercle of the sacrum, and the sacrum is the center bone of the pelvis. In order for the human body to use the constructive force of gravity, it is necessary for that center to remain at that point at all times, and to be returned to the normal point, if shifted out of normal position by any force whatsoever. Any permanent shifting of the center of gravity can and does cause the frame-work of the human body to become distorted and strained beyond its elastic limits, and deformity of the whole body, inside and out, results. The body entirely loses its normal shape and contours, and exhaustion and constant fatigue from the unconscious struggle that the body makes against the normal force of gravity, causes the body to destroy itself with what is commonly known as disease.

There have been many methods proposed for restoring the body to normal posture, but none of these has been successful because the center of gravity has been maintained thereby only for a short time, if at all. The results of most methods are not only ineffective but positively destructive because force is used against gravity which only results in more strain and fatigue.

In view of the foregoing explanation, the present invention has for its primary object the provision for mechanically positioning and moving the human body in such manner as to gradually restore the center of gravity to normal, and yet without force, without strain and without fatigue.

With the present invention, the body is permitted, without force or strain, gradually to assume its normal position with respect to its center of gravity, i. e., the normal force of gravity is used constructively to counteract the destructive force of gravity which has resulted in strain, distortion and deformity.

The present invention must be used in its entirety and as a unit, in order to obtain the results desired. While it is to be understood that the apparatus may or may not be made integral, one part with another, all parts must be used as a unit to be effective in the results obtained and no one part is operatively independent of the other parts.

It is well-known that no two human bodies have exactly the same body framework, and it has also been found that all are under gravitational strain and distortion as a result of constantly trying to resist the destructive force of gravity.

A further object of this invention is to provide for the adjustment of the apparatus to the various sizes and shapes of human bodies.

The spine is delicately balanced upon the center of gravity of the sacrum, in the normal body. If this center of gravity is lost, the sacrum, the spine, and consequently, other parts of the body must change to conform to the changed position of the center of gravity, in order for the body to maintain an erect posture; and as the framework of all the body above the pelvis depends on the spine and is attached to the spine, a change in the center of gravity causes a change in the whole body. When this center of gravity is changed, the whole body will become distorted just as a house will sag if the corner of the foundation is lost, and eventually the framework of the whole building is distorted and cannot be restored to its normal structure until the foundation is again level and the center of gravity is restored.

The human body moves by the action of certain muscles over which it has control. The individual has no control over the ligaments, the tissues that hold the joints together in proper position and relation. If a joint slips out of its normal position, the body, by exertion of force on the muscles over which it has control, cannot bring the joint back to its normal position.

By removing the weight from the pelvis and by reversing the pull of gravity on the spine and framework of the body, the pelvic bones can be re-aligned, so as to bring the center of gravity back to its normal position, as a house would be jacked up on a low or broken foundation to allow the whole structure to become level.

The apparatus embodying this invention is illustrated in the accompanying drawings, in which:

Fig. 1 is a side elevation of the apparatus, showing an individual in position on the adjustable table and with the positioning and articulation apparatus in position for use, parts being broken away and in section to show the mechanical structure;

Fig. 2 is a cross section of the articulation device, taken on the line 2—2 of Fig. 1, with the cranks shown in opposed relation;

Fig. 3 is an end elevation of the articulation device, with the cranks shown in parallel congruent relation for imparting a single synchronous, unitary movement upon each revolution of the cranks;

Fig. 4 is a side elevation of the articulation device;

Fig. 5 is an enlarged fragmentary sectional view of the crank mechanism of the articulator;

Fig. 6 is an enlarged view, partly in section, of a shifter yoke for the friction drive disc of the articulator;

Fig. 7 is an enlarged detail sectional view of the adjustment mechanism for the friction driven disc of the articulator;

Fig. 8 is a perspective view of the positioning belt and articulating straps in position for use in connection with the articulator;

Fig. 9 is a plan view of the positioning belt in extended position, and with adjustment of parts shown in dash lines;

Fig. 10 is a cross section thereof, on the line 10—10 of Fig. 9;

Fig. 11 is a plan view of the pad portion of the positioning belt;

Fig. 12 is a cross section thereof, on the line 12—12 of Fig. 11;

Fig. 15 is a view similar to Fig. 14 but with the cushions removed to show details of construction of the framework and mechanism of the table;

Fig. 16 is an end elevation of the table;

Fig. 17 is a cross section on the line 17—17 of Fig. 13;

Fig. 18 is a fragmentary side elevation of the hinge latch mechanism for the cushions;

Fig. 19 is a fragmentary bottom plan view, with parts broken away, of the hinge latch mechanism for the cushions;

Fig. 20 is an enlarged fragmentary sectional view of the rail latch mechanism for the adjustable table;

Fig. 21 is a fragmentary sectional view of the foot rest mechanism therefor;

Fig. 22 is a fragmentary sectional view of the winch drum locking mechanism;

Fig. 23 is a side elevation of a unitary table and articulation device, as a modification;

Fig. 24 is a top plan view thereof;

Fig. 25 is a view similar to Fig. 24, but with the cover removed from the articulation device and with the cushions removed from the table;

Fig. 26 is an enlarged view of the articulation device, with the side rails of the table shown in section;

Fig. 27 is a view taken at right angles to Fig. 26, showing the articulation device positioned on a fragmentary portion of the side rails of the table;

Fig. 31 is a fragmentary horizontal section taken on the line 31—31 of Fig. 26; and Fig. 32 is a sectional view taken on the line 32—32 of Fig. 26.

This apparatus has been designed to apply the natural law of gravity to the human body but without force, strain or fatigue, in order to allow the body to restore itself to normal after strain and distortion as a result of a change in the normal center of gravity. This apparatus comprises a unit composed of an articulator A, a belt B operatively connected therewith and applied to the patient while held in a proper position on a table T. All of these parts are necessary and cooperate to give the desired results.

With more particular reference to the drawings, the adjustable table is designated generally as T in Fig. 1, and is shown more in detail in Figs. 13 to 19 inclusive. The numeral 1 designates the legs with side rails 2 secured to the upper ends thereof, and end rails 3 positioned at either end of the table and secured together with L-members 4, to make up the skeleton framework of the table T.

Figure 13:
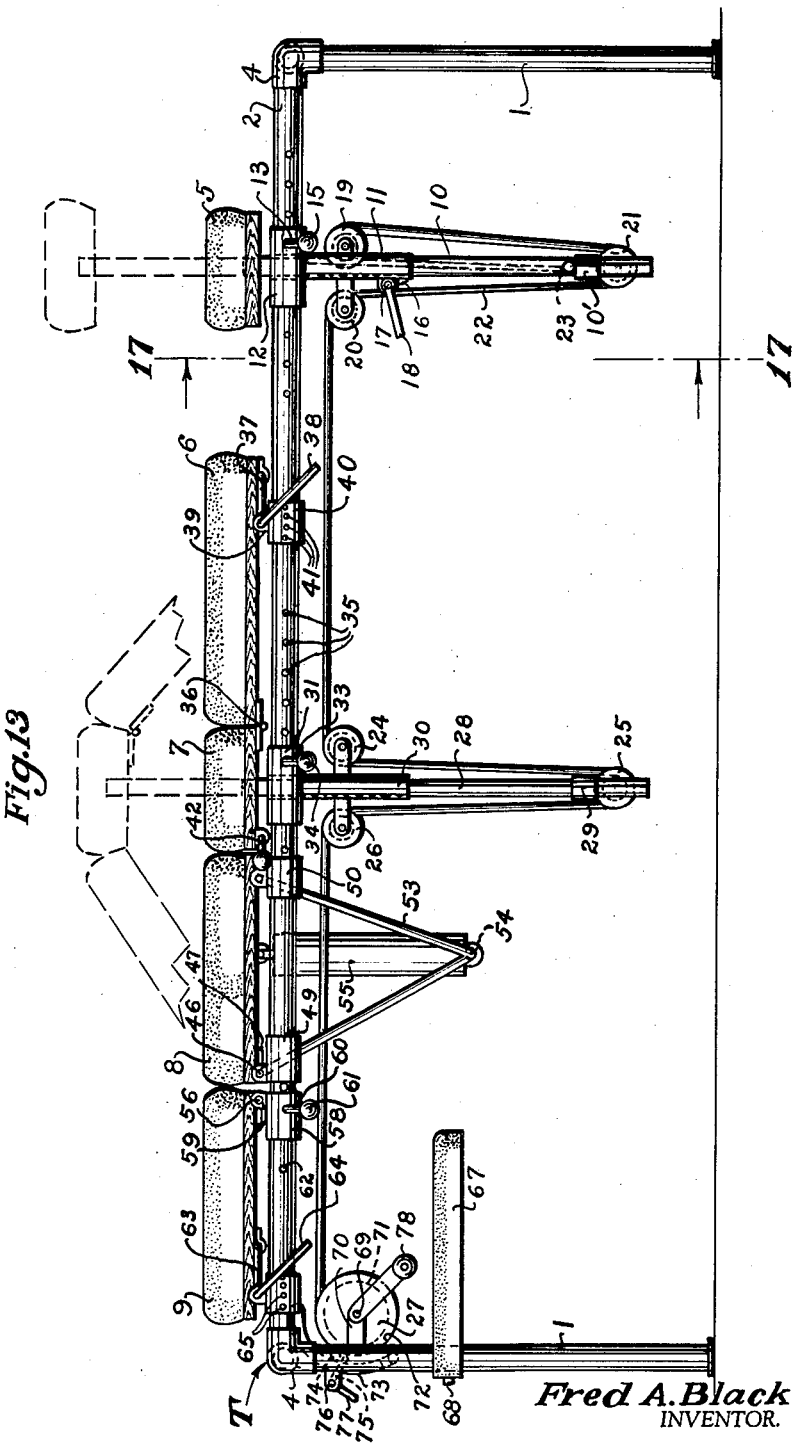
Fig. 13 is a detailed side elevation of the adjustable table, with portions shown in adjusted positions by dotted lines.
Figure 14:
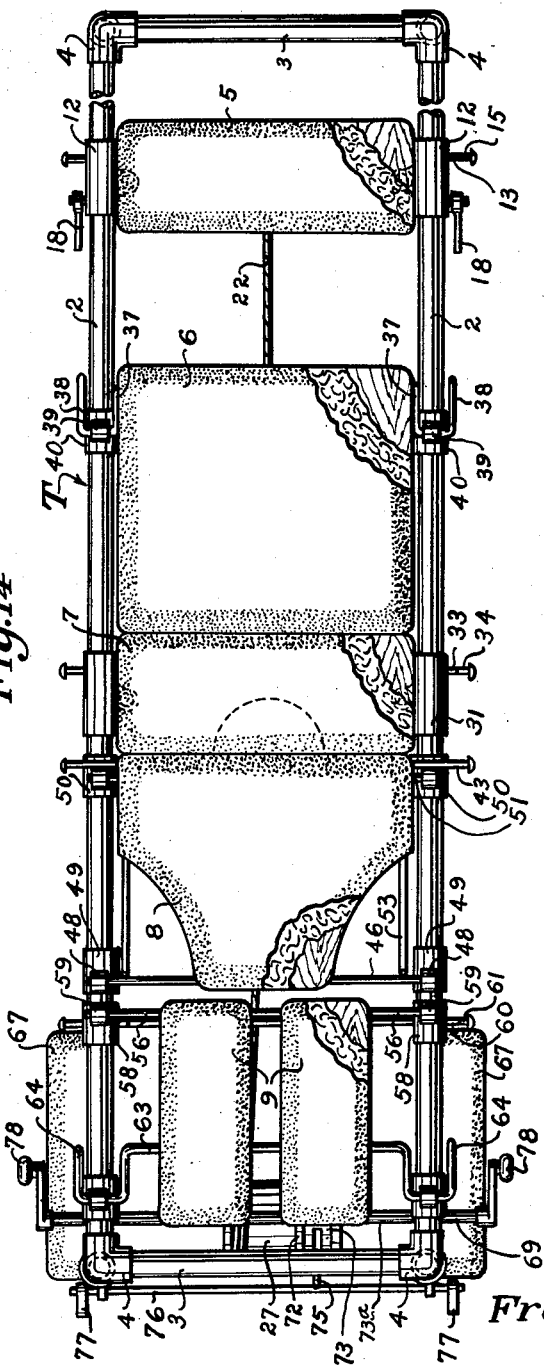
Fig. 14 is a plan view of the adjustable table, with parts broken away to show details of construction.
Figure 28:
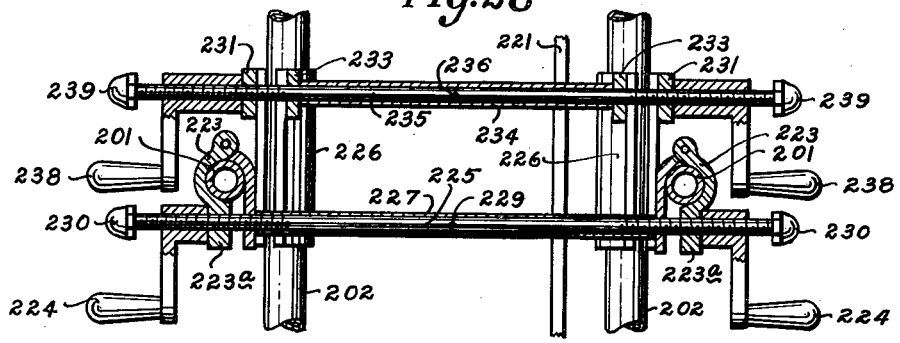
Fig. 28 is a sectional view taken on the line 28—28 of Fig. 27.
Figure 29:
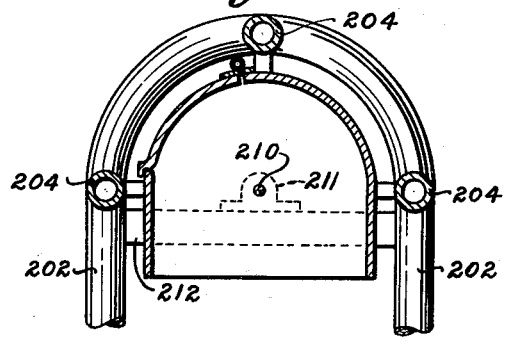
Fig. 29 is a sectional view taken on the line 29—29 of Fig. 26.

A series of cushions 5, 6, 7, 8, and 9 are positioned upon the framework formed by the side rails 2 and the end rails 3. The cushion 5, which is normally in the position shown in full lines in Fig. 13, is mounted on the upper end of a pair of vertical standards 10 which are slidable in guides 11 and secured together by a cross member 10' (Fig. 17).

The guides 11 are secured to sleeves 12 which are slidable on side rails 2, and the tubular guides 11 are secured together by a cross member 11'. The sleeves 12 are secured in place by latches 13 (Figs. 17 and 20) which are drawn inwardly by a spring 14. The latches 13 are supported on a rod 15 extending from side to side of the table T, so that the latches may be operated conveniently from either side thereof.

A latch 16 is provided on one of the slidable guides 11 for locking these guides 11 rigid with the vertical standards 10, if desired, said latch 16 inter-engaging with holes 16' in the adjacent vertical standard 10. A rod 17 is mounted in lugs 17' and extends to opposite sides of the table T with handles 18 on the outer ends thereof to operate the latch 16 from either side of the table T.

Pulleys 19 and 20 (Figs. 13 and 17) are on the mounted cross member 11', and a pulley 21 is mounted on the cross member 10'. The pulleys 19, 20, and 21 receive one end portion of a cable 22, the extreme end of which is attached to loop 23 on the cross member 10'. The intermediate portion of the cable 22 extends about pulleys 24, 25 and 26 with its end extending to a winch drum 27, as will be more fully described hereinafter.

A pair of vertical standards 28, having a cross bar 29 between the lower ends thereof, project upward through vertical guide members 30. The standards 28 and guide members 30 are similar to the standards 10 and guide members 11. The guide members 30 are secured at one end to horizontal sleeves 31, and have an inter-connecting cross bar 32 which supports the pulleys 24 and 26. The horizontal sleeves 31 carry latches 33 which are attached to a rod 34 and interlock in holes 35 in the side rails 2 for longitudinal adjustment of the cushion 7 which is mounted on top of vertical standards 28. Cushions 6 and 8 are normally hingeably attached to either side of the cushion 7 and are movable therewith along the side rails 2.

The cushion 6 is hinged to the cushion 7 by a hinge 36 at one end, and the other end thereof is supported by a U-shaped shaft 37 for adjustment of the rear end of the cushion, by manipulation of a lever 38 which is secured to said shaft 37 and extends to opposite sides of the table T. The shaft 37 is journaled in bearings 39 disposed on slidable members 40 which are slidable along the side rails 2. A series of bosses 41 are formed on the side of tubular slide member 40 in position to engage frictionally the lever 38, so as to permit adjustment of the lever 38 with respect thereto in adjusting the U-member 37 to raise and lower the rear end of the cushion 6, and to hold said shaft and the lever 38 in adjusted position.

The cushion 8 is detachably hinged to the front end of the cushion 7 by a latch member 42, as shown in Figs. 18 and 19. The latches 42 are fixed on a square rod 43 which extends through lugs 44 mounted on the bottom of the cushion 8. The outer end of each lug 44 extends outward and passes between a pair of lugs 45 fixed to the cushion 7, so as to align the holes in the lugs 44 and 45, whereby the cushions are in joined relation.

The front end of the cushion 8 is hinged to a shaft 46 by a hinge member 47 as shown in Figs. 13 and 15. The shaft 46 is journaled in lugs 48 which are positioned on sleeves 49 which are mounted on side rails 2. Spaced between the sleeves 49 and the sleeves 31 are sleeves 50, which are also positioned on the slide rails 2. The sleeves 50 carry a brace 51 therebetween, which brace forms one end of a framework 53 that supports a pneumatic power device 55 mounted on a rod 54. The upper end of the plunger of the air check device 55 is secured to the lower side of cushion 8 to check the descent thereof, when released by the latch 42, as will be more fully described hereinafter.

A pair of cushions 9 in side-by-side relation (Fig. 14) have one end thereof mounted on a shaft 56 by hinge members 57, and said shaft 56 is connected to sleeves 58 by lugs 59. A latch 60 is carried by the sleeves 58 and operable by a rod 61 which projects to opposite sides of table T, for manipulation from either side thereof. The sleeves 58 are adjustable along the rails 2, and the latch 60 may engage within a hole 62 to secure the cushion 9 in a longitudinally adjusted position.

The front end of the cushion 9 is mounted on a U-shaped shaft 63 which has a lever 64 integral therewith, for making vertical adjustment of the front end of cushions 9. The U-shaped shaft 63 extends to opposite sides of the table T, and the lever 64 engages with bosses or projections 65 to hold the lever 64 in adjusted position. The cushions 9 are secured to the U-shaped shaft 63 by hinge members 66. Both the hinge members 57 and 66 are transversely slidable on the shafts 63 and 56, respectively, to secure the proper transverse adjustments of the cushions 9, so as to conform to the needs of the individual upon the table.

An arm rest 67 is provided on opposite sides of the table T; said arm rests are mounted on the forward end legs 1 for vertical adjustment relative thereto. A set screw 68 (Fig. 16) is provided to secure each arm rest 67 in an adjusted position.

The winch drum 27 is mounted on a shaft 69 which projects through lugs 70 on front end legs 1. A crank 78 is positioned on either end of the shaft 69 for operation of the winch drum 27. On one end of the winch drum 27, integral therewith, is a cylinder 71 which has a rim 72 on either side thereof.

An arcuate member 73, as shown in Fig. 22, wedgingly converges with respect to the cylinder 71 and is mounted on rods 73a and 73b which extend between the inner arcuate surfaces of member 73 and the cylinder 71 for frictionally locking the cylinder 71. The rims 72 confine the roller 74 against longitudinal displacement. The arcuate member 73 is bifurcated and receives a finger 75 therein for release of the roller 74. The finger 75 is mounted on a shaft 76 which extends to either side of the table T and has a handle 77 mounted on each end thereof to operate the roller release finger 75, as will be hereinafter more fully described.

An articulator, designated generally by the letter A (Figs. 1 and 2), is positioned at the foot of the table T, and includes a cabinet 91 encasing the mechanism and forming the supporting structure therefor. Casters 92 are attached to the bottom of said cabinet 91 to allow it to be positioned readily in place for use. The cabinet 91 has a shelf 93 on which a motor 94 is mounted. Electric power is supplied to the electrical motor 94 through wires 94'.

A belt 95 from the motor drives a friction drive disc 96 which is mounted on a shaft 97 that is journaled in bearings 98. A hingeable adjustment crank 99 (Fig. 7) is mounted on a screw member 100, and has a ball contact friction member 101 disposed intermediate said screw member 100 and the shaft 97. A sleeve member 102 secured to a side of the cabinet 91, is threaded at one end to receive the screw 100 for longitudinal adjustment of the shaft 97. Holes 103 are provided in the wall of the cabinet 91 to receive selectively the end of the crank 99 which swings thereinto, as indicated by dotted lines in Fig. 1, so as to hold the screw 100 in an adjusted position.

A friction driven wheel 104 is slidably disposed on a shaft 105 and is keyed thereto by a key 106 for rotation with said shaft. The wheel 104 has its peripheral face in contact relation with the friction drive disc 96, and is slidable across the face thereof by a shifter lever 107, which has a yoke 108 supported on the lower end thereof for engagement with a groove 109 within the hub of the friction driven wheel 104.

A segment 110 is provided inside the cabinet beside the shifter yoke 107. The segment 110 has a series of holes 111 which are adapted to receive selectively a projection 112 disposed on the side of the lever 107. This projection 112 will hold the lever 107 in an adjusted position.

The shaft 105 is journaled in bearings 113 which are secured to sills 114 on either side of the cabinet 91. The shaft 105 projects outwardly of the cabinet, and has fixed on each opposite end thereof a sleeve 115 by a pin 116 (Fig. 5). A crank member 117, rectangular in cross section, is slidably and removably positioned within a hole 118 transversely of the sleeve member 115, and is secured in place by a set screw 119 threaded through a side of the sleeve 115 and engaging the crank member 117. The crank 117 has a crank pin 120 on an end thereof, on which is journaled a bearing member 121.

The bearing member 121 has a loop 122 on a side thereof for connection with a hook 123 on one end of a spring 124 (Figs. 1 and 8). The opposite end of the spring 124 is attached to a loop 125 which is adjustably secured to a strap 126 by a buckle 127. The strap 126 has a hook 128 for attachment to a loop 129 or a loop 130 of the belt, generally designated by the letter B. Similar straps are provided at opposite sides of the belt B.

The belt B is preferably made of strong leather or other flexible material, and the body thereof is designated as 131, and has a soft leather lining 132. The body 131 has a recess 133 (Fig. 9) in the lower abdominal edge thereof so as to allow said belt to fit comfortably over the pubic of the pelvis. A projection 134 on the body 131, is located in the upper portion of belt B so as to give support to the lower portion of the abdomen when the belt is in place. The belt body 131 has a pair of straps 135 and 136 slidably secured thereto by loops 142 and 143, which straps encircle the lower portion of the body (see Fig. 1), and are secured to a sacrum pad 137 in adjusted position of the straps 135 and 136, which straps engage buckles 138 and 139, respectively, for adjustable attachment to the sacrum pad 137.

Holes 135' and 136' are provided in either end of the straps 135 and 136 to engage the buckles 138 and 139 and secure the belt B around the sacro-iliac portion of the human body. The sacrum pad 137 is adjusted in the center of the back above the spine by the buckles 138 and 139 engaged in the holes 135' and 136'. These holes are numbered so that an exact adjustment can readily be made. Center marks 144 and 145 are provided on the loops 142 and 143 to aid in centering the belts with respect to the human body. The strap 135, secured to the upper portion of the belt, extends about the lower abdomen and the lumbar area of the spine.

This sacrum pad 137 is preferably made of strong leather and is lined with soft leather or other suitable material 140. The strap 136 has slidable members 141 mounted thereon and positioned near the outer extremity of the belt B carrying the loops 129, so that these adjustable members 141 may be positioned over the trocanter of the femur. A loop or ring 130 is secured to the lower end of the sacrum pad 137 for connection of straps 136 therewith at this point, as will be more fully described hereinafter.

It is to be understood that the table T and the articulator A, while described separately, may be made integral, as shown in the modified form illustrated in Figs. 23 to 32, inclusive, and their operation and effectiveness are inter-dependent and they may not be used separately and the desired results obtained fully. The table T and the articulator A must, in turn, be used with the belt as described, the table for maintaining the body of the individual in the desired position, and the belt, for holding the body in position and to provide means for transmitting the movements of the articulator to the body of the individual.

In the operation of the apparatus described above, the body of the individual, upon whom the positioning belt B has been secured in place, is usually placed face down on the table T in prone position (Fig. 1), which table is shown in full outline in Fig. 13. The various cushions 5, 6, 7, 8 and 9 are first adjusted longitudinally on side rails 2 with respect to the proper proportions of the individual's body, and the face cushions 9 are adjusted transversely on the U-shaped rod 63, as well as angularly by adjustment of the lever 64.

When the table has been adjusted in such manner as to be suitable and comfortable to the body of the individual, he is raised then to a position similar to that as shown in Fig. 1, by means of the winch drum 27 which winds up the cable 22 thereon. The cable 22 is secured at one end to the transverse cross bar 10' by the eye or loop 23, and passes thereupon over the pulley 19, under the pulley 21, and over the pulley 20, so as to form a three-line block and tackle arrangement which is operated by turning the crank 78 on the winch drum 27. The cushion 5 will be lifted into the position as shown in dotted lines in Fig. 13. When the cushion 5 is thus raised to the desired position, the latch 16 may be set to engage selectively in holes 16' the vertical standard 10 upon which the cushion 5 is supported and which will hold the cushion 5 in the desired adjusted position.

The cable 22 passes over the pulley 24, under the pulley 25, and over the pulley 26, and is wound on the drum 27 upon turning of the crank 78. It may be pointed out that, since the three-line block and tackle, connected to raise the cushion 5, has a greater lift than the two-line block and tackle connected to raise the cushion 7, the cushion 5, which provides the foot rest, will be raised first. When the cushion 5 has been raised to the desired adjusted position, the latch 16 will prevent further ascent of the standard 10 carrying the cushion 5, and yet the cable 22 will continue to raise the cushion 7 to which the cushions 6 and 8 are hinged. When these cushions have been raised to the points substantially as shown in dotted lines in Fig. 13, and also in full lines in Fig. 1, the individual is in the desired position.

In the application of the apparatus, the individual is preferably placed face down in prone position on the table T (Fig. 1) with the belt in place about the sacro-iliac area of the body and secured in place by the adjustable straps 135 and 136. The system may be used, however, with the individual lying on his back, face up, for certain manipulations. With the individual thus positioned on the table T, and with the belt B secured over the sacro-iliac area of the individual's body, and adjustably secured in place by the straps 135 and 136, the hooks 123 are connected to the loops 122 on the cranks 117 of the articulator A which is positioned at the foot of the table T. The cranks 117 are adjusted with respect to the shaft 105 to provide either opposite throws of the cranks extending in opposite directions from the shaft 105 or extending in the same direction from the shaft 105, as shown in Fig. 2 and Fig. 3, respectively, as desired for the different movements to be accorded the body of the individual, which will be more completely described hereinafter.

With the cranks in opposed relation with respect to the shaft 105 (Fig. 2) and with the springs 124, or other resilient members, connected thereto, the straps 126 are connected to the rings 129 on the belt B on the patient. The adjustable table T is so positioned that the weight of the body is sustained on the pelvis, with the spine pivoted at the fifth lumbar vertebrae, and the weight of the head and upper torso putting a natural tension on the spine from the fifth lumbar toward the head, and with the tension on the spine below the fifth lumbar maintained by the weight of the feet and legs, the body of the individual is then in the desired position so the destructive force of gravity may be counteracted, and for misaligned joints to move back into normal position when gentle, normal movement is imparted to the body by the articulator, similar to the movement accorded by walking.

The articulator A is actuated by the motor 94, and, with the belt and table adjusted as described, a walking motion is given to the body of the individual, while the weight is removed therefrom. At the same time, a lateral rocking movement is given to the sacrum and to the vertebrae directly above, and thus, with the body in the position described, the whole spine is released from abnormal position and the vertebrae are allowed to assume their normal position and relation one to the other.

To accomplish this type of movement, the motor 94 drives the V-belt 95 which in turn drives the friction disc 96. The friction driven wheel 104 on the shaft 105 is in driving relation with the disc 96. The shifter lever 107 is provided to shift the friction driven wheel 104 in an adjusted position to give the desired speed to the cranks 117. Since a wide range of speeds may be desired or necessary for the cranks 117, the friction driven wheel 104 may be shifted from approximately zero speed, at the center of the friction drive disc 96, to a comparatively fast speed, near the outer periphery thereof. The length of the throws of the cranks 117 may be adjusted with respect to the shaft 105 by sliding through the holes 118 and secured in adjusted positions by the set screws 119.

When the proper selected speed for cranks 117 has been determined, together with the proper length of throw, the motor 94 will operate the cranks 120 which will exert an alternating pulling movement through springs 124, straps 126 and loops 129, on the belt B. This will accord to the body of the individual a natural movement to the sacro-iliac area while the body is in adjusted position and thus make it easy, normal and natural for the hip joints to align themselves into normal position, and thus level the foundation of the body which, in turn, allows other misaligned and distorted weight bearing joints and the muscles connected thereto, to assume normal positions.

The springs 124 give sufficient resilience to the mechanical movement, so that it is relieved of jerkiness and shock impact before it reaches the body of the individual, thus further relieving strain and fatigue.

All distortions are the direct result of subluxations of the sacro-iliac articulations, resulting in the loss of the center of gravity both of the sacrum and of the body. Since such distortions have taken place while the body is in upright or standing position, as long as the body is in standing position it will become still more distorted in the effort it makes to maintain the center of gravity in that upright positon. Therefore, in order to relieve strain, fatigue and distortion, the body is relieved of the gravity pull of its upright position, and the weight relieved from the weight bearing joints, the movement described above is accorded to the body so that it may relieve itself of distortions without strain and fatigue.

With the body of the individual supported in such adjusted position on the table T, all compression weight is relieved from the spine, and with the spinal column held in tension by the weight of the body itself only, due to the downward inclination of the head and upper torso, the joints of the spinal column are allowed to resume their natural, normal positions.

With the cranks 117 of the articulator A, projecting in the same direction from the shaft 105 (Fig. 3), and with the body of the individual in adjusted position on the table T, and with the belt B in place on the body of the individual, another movement is effectively carried out.

As illustrated in dotted lines in Figs. 1 and 8, the hooks on the straps 126 are connected to the loop 130 secured to the lower end of the sacrum pad 137. The cranks 117 are positioned so as to project in the same direction from the shaft 105, and adjusted within holes 118 to give the proper throw to the cranks. The motor 94 is then started, as above described, to actuate the articulator. With the straps 126 connected to loop 130, and with the cranks operating in the same direction, and with the body of the individual supported on the pelvis, and with the weight of the head and upper torso holding the vertebrae of the spine in tension above the fifth lumbar, and the weight of the lower body and legs holding the vertebrae below the fifth lumbar in tension, the belt B holds the hip joints in fixed positions and exerts an oscillatory, anterior posterior movement to the sacrum with respect to the ilium bones, and also gives whatever movement is possible to the sacro-iliac joint, and thus allows the joints of the sacro-iliac area to free themselves of distortion and to assume normal positions, thus further leveling the foundation or the weight-bearing portion of the body, so that other distortions are relieved because the normal center of gravity is restored.

The table T may be adjusted with respect to the cushions, both vertically and horizontally, after the body of the individual is in place, and that they may be returned to their original positions with the body of the individual still in prone position thereon. This relieves the individual of unnecessary strain, fatigue and movement, and makes any manual lifting or handling of the body of the individual by the operator unnecessary.

It is pointed out that the apparatus is neither a stretcher nor an exerciser, as no effort whatsoever is required of the individual, and all movement is accorded by the articulator. The apparatus is so designed as to be adjustable from either side, and to hold the body in adjusted position with the weight removed from the spine and the weight-bearing joints. With the gravational pull in reverse, distortion or misalignment of joints is thus made free to resume normal position, without any force being exerted on the body of the individual, and with the process being free of fatigue and strain for the individual. Thus positioned and with normal body movement, the body will become normally aligned with its normal center of gravity. When the joints are allowed their normal positions, with the body upright, the muscles will tend to hold them in normal positions.

As the joints are allowed to assume normal, aligned position the muscle tonicity will hold them that way, and in this manner, with repetition of the positioning and movements of the apparatus, distortions and deformities are reduced and the body of the individual, being in alignment, will function normally without strain and fatigue.

With more detailed reference to the modified form of the invention, as shown in Figs. 23–32, inclusive, this form of the invention accomplishes all of the movements of the form heretofore described, and in addition thereto, an adjustment is provided whereby the articulator mechanism may be moved toward or away from the individual on the table, or raised or lowered to get the proper angle of pull of the resilient elements which are attached to the individual by the belt.

The operation of the mechanical elements of the table T' of the modified form is substantially the same as that described for the form of the invention as illustrated in Figs. 1 and 13–23, inclusive. However, the side rails 201 are extended in length so as to accommodate the articulating machine designated generally by the letter M.

The machine M (Figs. 26 and 27) is preferably constructed of a tubular framework 202 which forms four upright posts connected together in pairs by a curved portion. Braces 204 interconnect the top portion so as to give the machine rigidity. The bottom portion of the framework 202 is connected together by base members 203, secured to the posts 202. A bed plate 205 is mounted on the base members 203 so as to form a mounting place for a motor 206. The motor preferably has a gear reduction unit 207 built integral therewith. A gear shifter lever 208 extends from a side thereof. If desired, a further reduction can be accomplished by cone pulleys 209 mounted on the shaft of the motor 206.

A crank shaft 210 is journaled in bearings 211 which are mounted on frame members 212 near the top of the frames 202. A hub 213 is secured to either end of the crank shaft 210, which hub has a plate 214 secured to the inside thereof as by welding, and has a spherical segment 215 secured to said plate so as to form a guard or shield for the resilient elements or straps, as will be hereinafter more fully set forth.

Figure 30:
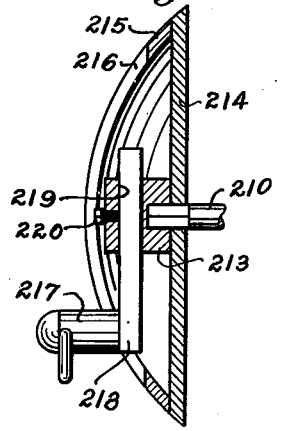
Fig. 30 is a sectional view through one of the crank mechanisms and the guard shield, and showing a fragmentary portion of the crank shaft.

A slot 216 is formed transversely across the spherical segment 215 to receive the crank 217. The crank preferably has a square shank 218 which interfits with a square hole 219 in the hub 213. A set screw 220 secures the crank in the desired adjusted position. The crank 217 is reversible with respect to the hub 213 so the cranks on opposite ends of the crank shaft 210 may be operated in parallel unitary relation or in opposed relation. A sectional detail of the crank and hub is shown in Fig. 30. A belt 221 interconnects the cone pulleys 209 with inversely disposed cone pulleys 222.

The articulator machine M is mounted for longitudinal adjustment on the rails 201 by hinged clamps 223 which simultaneously engage the rails 201 on opposite sides of the frame, by manipulation of either of the cranks 224 which are threaded on opposite ends of a shaft 225. The threaded shaft 225 passes through ears 223a of the clamps 223 so as to compress the clamps into engagement with the rails 201. The hinged clamp 223 preferably extends the full width of the frame 202 along the side rail 201, and the inner side of the clamp 223 is attached to vertical, split tubular guide members 226. A slidable sleeve 227 surrounds the threaded shaft 225, and is slightly less in length than the distance between the inner faces of hinge clamps 223. One end of the tubular sleeve 227 is rigidly secured, as by welding, to the inner surface on one of the hinge clamps 223, so as to prevent the tubular members from turning.

A slot 228 is provided within the tubular member 227 and receives a pin 229 therethrough, which pin is fixed to the shaft 225 and is slidable along the slot upon longitudinal movement of the threaded shaft 225 but prevents rotary movement of said shaft relative to the sleeve. An acorn nut 230 may be secured to each outer end of threaded shaft 225 to retain the crank 224 on the shaft 225.

The outer edge of the inner portion of the clamp 223 is substantially tangent to the inner side of the rail 201, so that the articulator machine M may be readily removed from the rails.

The split tubular guide members 226 are mounted on the respective four vertical posts which form the framework 202. Bars 231 extend parallel to side rails 201 and are secured to the split guide members 226 at either end, as by welding, as shown in Figs. 27 and 31. A bar 232 is secured to the inner sides of each pair of split tubular guide members 226 on the opposite side of the mouth 233 from the bar 231. It is preferable to have the ends of bar 232 welded to the tubular split guide members 226.

A tubular spacing sleeve 234 is positioned between the inner sides of opposed bars 232 and is slightly less in length than the normal distance therebetween. One end of the tubular spacing sleeve 234 is secured to the adjacent bar 232 as by welding. A threaded shaft 235 passes through openings in the bars 231 and 232 and through the sleeve 234, and is slidable therethrough, but said threaded shaft 235 is secured against relative rotation by a pin 236 which passes through threaded shaft 235 and through a slot 237 in the sleeve. This permits free longitudinal movement of the threaded shaft 235 upon the turning of the cranks 238, which are threaded at either end of said threaded shaft. Acorn nuts 239 are secured to each end of the threaded shaft 235 to retain the crank members 238 thereon.

In the operation of the modified form of the invention, as shown in Figs. 23–32, inclusive, the individual is positioned on the table T' and raised into adjusted position, as shown in Fig. 23. Resilient members 240, which may be composed of elastic rope, are connected with the belt B, substantially in the same manner as set forth heretofore relative to the preferred form of the invention, and the articulator machine M is adjusted longitudinally along the rails 201, by loosening clamps 223 through the use of the crank 224 on either side thereof. When the articulator machine M is in correct position on the side rails 201, either of the cranks 224 is screwed up, which will draw the threaded shaft 225 longitudinally, causing the opposite crank 224 to compress its adjacent clamp 223 until the latter is in engagement with the free end of sleeve 227 which will transmit a clamping action to the other clamp 223 simultaneously. The threaded shaft 225 is prevented from rotation by the pin 229 which is positioned within the slot 228 as one end of the sleeve 227 is welded to the clamp 223. Therefore the articulating machine M will be securely clamped to the side rails to prevent any vibration or movement of the motor 206 on the crank mechanism 217.

When it is desired to remove the entire articulating unit M from the frame 201, acorn nuts 230, which are preferably pinned to the threaded shaft 225, are removed, thereby permitting the removal of the cranks 224. The pin 229 is then removed from the slot 228 which will permit the shaft 225 to be removed from the sleeve 227. The clamps 223 hingeably open, which will permit the articulating mechanism M to be lifted outward off the side rails 201 of the table T'.

With the articulating machine firmly secured on the side rails 201, the cranks 238 may be loosened to permit vertical adjustment of the articulator machine frame 202 so the cranks 217 may be properly positioned with respect to the individual. When the cranks 238 are loosened, tension will be removed from the bars 231 and 232 to permit the slotted guide members 226 to expand, thereby loosening their grip on the posts which form the framework 202. This will enable the frames 202 to be moved vertically with respect to the slotted guide members 226. When the desired adjustment is secured, the cranks 238 are tightened on the threaded shaft 225 which will clamp against bars 231 and cause the free end of tubular sleeve 234 to bindingly engage the bar 232 so as to clamp the guide members 226 around all the tubular posts of the frame 202.

The motor 206 is adjustably secured to the bed plate 205 so as to tighten the belt 221. The motor drives the crank shaft 210 through the belt 221 which has cranks 217 positioned on either end of crank shaft 210. The throws of these cranks are adjustable and one of the cranks may be reversed with respect to the other, so their throws will be opposed for certain movements of the human body, as has been described heretofore.

The cranks 217 are partly positioned within the spherical segments 215 which cover the hubs 213 and parts of the cranks 217. Each spherical guard 215 permits only the outer rotatable portion of the crank and loop attached thereto to extend beyond the spherical segment or guard through the slot 216. The spherical segment 215 prevents the elastic rope 240 from becoming entangled in the mechanism of the crank.

The resilient ropes 240 are attached to the cranks in the manner hereinbefore described, to give the desired movements to the body of the individual on the table T'. This modified form of the device will give the same movements to the body of the individual as will the form of the invention previously described. However, this modified form combines vertical and horizontal adjustments of the articulator machine M with respect to the table T'.

In the form of the invention illustrated in Figs. 23 to 32, inclusive, a spring check 241 (Fig. 23) is provided beneath the abdominal pad which will permit a retarding of the descent thereof, to relieve the movement of speed and abruptness, which might be uncomfortable or annoying to the individual. This checking of the speed is similar to that effected by air check cylinder 55 to the abdominal pad 8 of the form of the invention shown in Fig. 13.

It is to be understood that, while the preferred form of the invention and a modification thereof have been described in detail, other modifications may be made within the scope and intent of the invention as claimed without departing from the spirit thereof.

I claim:

1. In apparatus for imparting periodic movements to the sacro-iliac area of the body, the combination of a table upon which the human body may be positioned, means for elevating certain portions of said table so as to elevate the sacro-iliac area and relieve the weight from the sacrum of said human body when positioned thereon, securing means about the sacro-iliac area of the body substantially over the elevating portion of the table and having attaching members on opposite sides of said securing means laterally of the table to impart an oscillatory movement to a point above certain joints of the sacro-iliac area, and means for alternately actuating said members in directions to impart lateral rocking motion to the joints of the sacro-iliac area of the body.

2. In a machine for imparting oscillatory movements to the human body, a table having an elevating portion, a belt adapted to be secured about the body substantially over the elevating portion, flexible straps secured to laterally opposite sides of the belt, and means for alternately applying pulling actions to the straps at the respective opposite sides of the belt.

3. In an apparatus for performing certain functional adjustments of the human body, the combination of a table comprising a base and a frame, a top member positioned on said frame, means for elevating said top member with respect to said frame for elevating the sacro-iliac portion of the body, a machine positioned substantially adjacent an end of said frame and having a belt substantially over the elevating top member and means connected therewith on opposite sides of the belt laterally of the table for imparting laterally rocking oscillatory movement alternately to opposite sides of the body on the table while the sacro-iliac portion of said body is in elevated position.

4. In a machine for imparting periodic pulling movements to the sacro-iliac area of the human body, a table having adjustable top portions, said table being adapted to receive the human body and one of said top portions being adapted to raise the sacro-iliac portion of the body while the other parts of the body are comparatively supine, a belt adapted to be secured about the sacro-iliac area of the body, straps secured at either side of the belt laterally of the table and resiliently connected to said belt for imparting alternate pulling action to said straps when said machine is operated.

5. In a machine for imparting oscillatory movements to the human body, a table having an elevatable portion, a belt adapted to be secured about the body substantially over the elevatable portion of the table, flexible straps secured to opposite sides of the belt laterally of the table, and means for applying pulling action alternately to the respective straps at the respective opposite sides of the belt, resilient means interposed intermediate said pulling means and said belt.

6. In a body manipulation apparatus, the combination of a table adapted to support the human body and including a central section in an elevated position and sections on opposite sides thereof extending downwardly therefrom substantially at obtuse angles to each other, said central section being adapted to support the sacro-iliac area of the body, a belt arranged over said central section in position to encircle the sacro-iliac area of the body, and means connected with opposite sides of the belt at points spaced laterally of said central section and actuated alternately to impart lateral rocking motion to the sacro-iliac area of the body.

7. In a body manipulation apparatus, the combination of a plurality of support members, means mounting said members for relative vertical adjustment with one of the members in an elevated position and with the members on opposite sides thereof in downwardly inclined relation with respect thereto and adapted to support the sacro-iliac area of the body on said intermediate elevated member with the opposite extremities of the body depending therefrom on the opposite support members, a belt arranged over said elevated intermediate support member in position to encircle the sacro-iliac area of the body, and means connected with opposite sides of the belt adjacent opposite sides of said elevated support member and actuated alternately to impart a lateral rocking movement to the sacro-iliac area of the body.

8. In a body manipulation apparatus, the combination of a plurality of support members, means mounting said members for relative vertical adjustment with one of the members in an elevated position and with the members on opposite sides thereof in downwardly inclined relation with respect thereto and adapted to support the sacro-iliac area of the body on said intermediate elevated member with the opposite extremities of the body depending therefrom on the opposite support members, a belt arranged over said elevated intermediate support member in position to encircle the sacro-iliac area of the body, and means connected with opposite sides of the belt adjacent opposite sides of said elevated support member and actuated alternately to impart a lateral rocking movement to the sacro-iliac area of the body, said means including a power driving member and flexible connections between said power member and the belt.

9. In a body manipulation apparatus, the combination of a supporting frame, body support members including a central member and members disposed on opposite sides thereof, means mounting said support members on the frame for vertical adjustment thereon to elevated positions and with the opposite members depending from said central member to support the extremities of the body with the sacro-iliac area thereof resting on said central member, a belt arranged over said central member in position to encircle the sacro-iliac area of the body, flexible devices attached to the belt at opposite sides of said central member in positions for imparting a lateral rocking action to the sacro-iliac area upon alternate actuation of said flexible devices, power means for operating the flexible devices including a crank shaft having cranks thereon adjacent opposite sides of the frame structure and connected with the flexible devices, said cranks being disposed out of phase with each other.

FRED A. BLACK.

REFERENCES CITED

The following references are of record in the file of this patent:

UNITED STATES PATENTS

| Number | Name | Date |
| --- | --- | --- |
| 460,640 | Huffer et al. | Oct. 6, 1891 |
| 520,576 | Scearce | May 29, 1894 |
| 522,526 | King | July 3, 1894 |
| 757,807 | Hazard | Apr. 19, 1904 |
| 850,744 | Flanders | Apr. 16, 1907 |
| 982,289 | Miller | Jan. 24, 1911 |
| 1,171,713 | Gilkerson | Feb. 15, 1916 |
| 1,213,137 | Albright | Jan. 23, 1917 |
| 1,239,522 | La Rock | Sept. 11, 1917 |
| 1,242,598 | Riddle | Oct. 9, 1917 |
| 1,261,424 | Miller | Apr. 2, 1918 |
| 1,735,569 | Gregory | Nov. 12, 1929 |
| 1,884,577 | Comper | Oct. 25, 1932 |
| 2,211,542 | Howell et al. | Aug. 13, 1940 |